United States Patent
Ghosh et al.

(10) Patent No.: US 12,100,815 B2
(45) Date of Patent: Sep. 24, 2024

(54) METAL ION BATTERY HAVING IONOMER MEMBRANE SEPARATOR AND FREE-STANDING ELECTRODE

(71) Applicant: COUNCIL OF SCIENTIFIC & INDUSTRIAL RESEARCH, New Delhi (IN)

(72) Inventors: Meena Ghosh, Pune (IN); Vidyanand Vijayakumar, Pune (IN); Sreekumar Kurungot, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 519 days.

(21) Appl. No.: 17/428,757

(22) PCT Filed: Feb. 4, 2020

(86) PCT No.: PCT/IN2020/050109
§ 371 (c)(1),
(2) Date: Aug. 5, 2021

(87) PCT Pub. No.: WO2020/161738
PCT Pub. Date: Aug. 13, 2020

(65) Prior Publication Data
US 2022/0158253 A1    May 19, 2022

(30) Foreign Application Priority Data
Feb. 5, 2019   (IN) .............................. 201911004481

(51) Int. Cl.
*H01M 4/00* (2006.01)
*H01M 4/24* (2006.01)
(Continued)

(52) U.S. Cl.
CPC ........... *H01M 10/26* (2013.01); *H01M 4/244* (2013.01); *H01M 4/663* (2013.01); *H01M 2300/0014* (2013.01)

(58) Field of Classification Search
CPC ............ H01M 4/48; H01M 4/42; H01M 4/38; H01M 10/38; H01M 10/26; H01M 4/663;
(Continued)

(56) References Cited

U.S. PATENT DOCUMENTS

2015/0104714 A1 * 4/2015 Galande .................. H01M 4/72
429/233
2015/0255792 A1 9/2015 Xu et al.
(Continued)

FOREIGN PATENT DOCUMENTS

CN     101540417 A    9/2009
CN     102110858 A    6/2011
(Continued)

OTHER PUBLICATIONS

Hu et al., "Zn/V2O5 Aqueous Hybrid-Ion Battery with High Voltage Platform and Long Cycle Life," ACS Applied Materials and Interfaces Article, Downloaded from http://pubs.acs.org on Nov. 21, 2017, pp. 1-20.
(Continued)

*Primary Examiner* — Cynthia H Kelly
*Assistant Examiner* — Monique M Wills
(74) *Attorney, Agent, or Firm* — CANTOR COLBURN LLP

(57) ABSTRACT

The present invention provides an energy storage device having high discharge capacity and high cycling ability. More particularly, the present invention provides $Zn/V_2O_5$ battery having cation selective ionomer membrane and free-standing electrode.

8 Claims, 10 Drawing Sheets

(51) Int. Cl.
  *H01M 4/66* (2006.01)
  *H01M 10/26* (2006.01)
(58) Field of Classification Search
  CPC ............. H01M 10/0563; H01M 4/244; H01M 2300/0014; H01M 2300/0011; Y02E 60/10
  See application file for complete search history.

(56) References Cited

U.S. PATENT DOCUMENTS

2016/0380268 A1* 12/2016 Bucur ................... H01M 4/602
                                                                429/218.1
2017/0207492 A1   7/2017 Adams et al.

FOREIGN PATENT DOCUMENTS

| CN | 102683757 A | 9/2012 |
| CN | 104272522 A | 1/2015 |
| CN | 107528066 A | 12/2017 |
| JP | 02148661 A | 6/1990 |
| JP | 2012524363 A | 10/2012 |
| JP | 2016513354 A | 5/2016 |
| JP | 2018186013 A | 11/2018 |
| WO | 2016197236 A1 | 12/2016 |

OTHER PUBLICATIONS

International Search Report and Written Opinion for International Application No. PCT/IN2020/050109; International Filing Date—Feb. 4, 2020; dated May 15, 2020, 8 pages.
Pan et al., "Functional Membrane Separators for Next-Generation High-Energy Rechargeable Batteries," National Science Review, (2017), vol. 4, pp. 917-933.
Pan et al., "Reversible Aqueous Zinc/Manganese Oxide Energy Storage from Conversion Reactions," Nature Energy, (2016), Article No. 16039, vol. 1, pp. 1-7.
Wan et al., "Aqueous Rechargeable Zinc/Sodium Vanadate Batteries with Enhanced Performance from Simultaneous Insertion of Dual Carriers," Nature Communications, (2018), vol. 9, Article No. 1656, 11 pages.
Zhang et al., "Rechargeable Aqueous Zn-V2O5 Battery with High Energy Density and Long Cycle Life," ACS Energy Letters, (2018), vol. 3, pp. 1366-1372.
European Extended Search Report for EP Application No. 20752132.9-1108; dated Jul. 17, 2023; 6 pages.
Ghosh et al., "Dendrite Growth Suppression by Zn2+—Integrated Nafion Ionomer Membranes: Beyond Porous Separators Toward Aqueous Zn/V2O5 Batteries with Extended Cycle Life," Energy Technology, (2019), vol. 7, (No. 1900442), 1-10.

\* cited by examiner

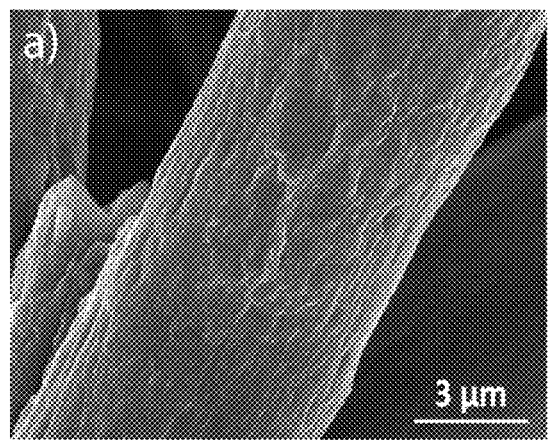
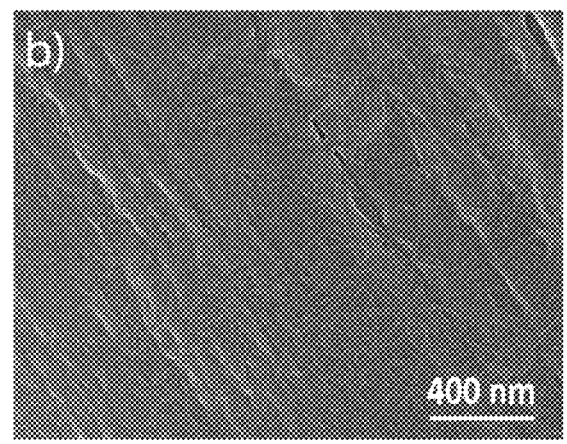
*Fig. 2a*          *Fig. 2b*
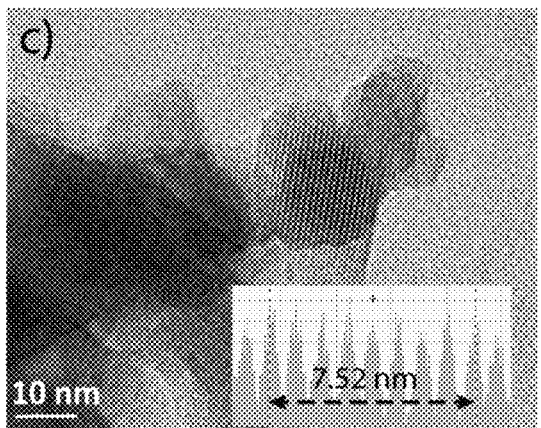
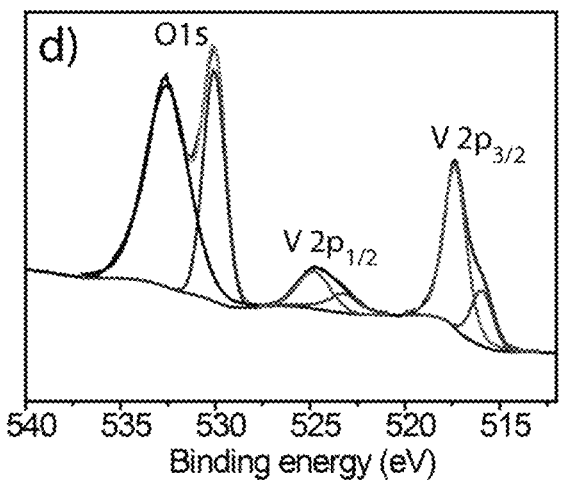
*Fig. 2c*          *Fig. 2d*
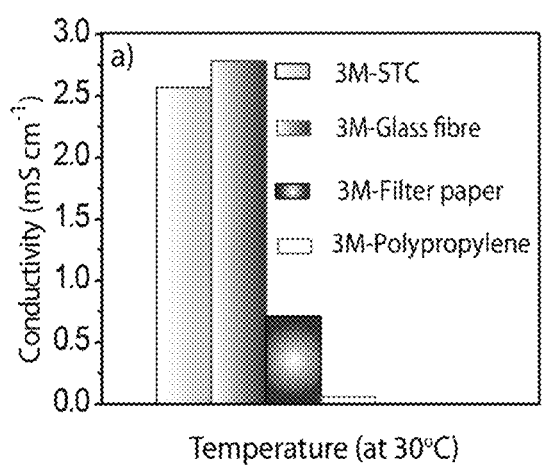
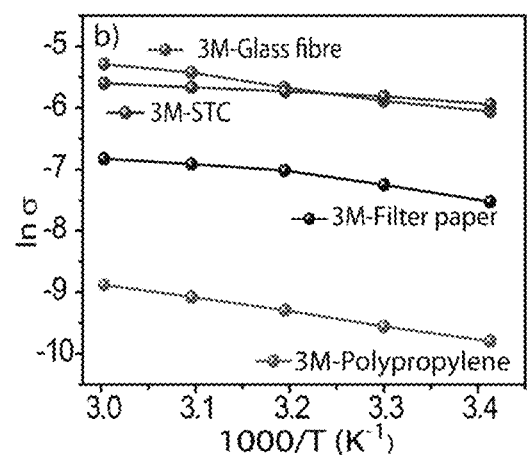
*Fig. 3a*          *Fig. 3b*

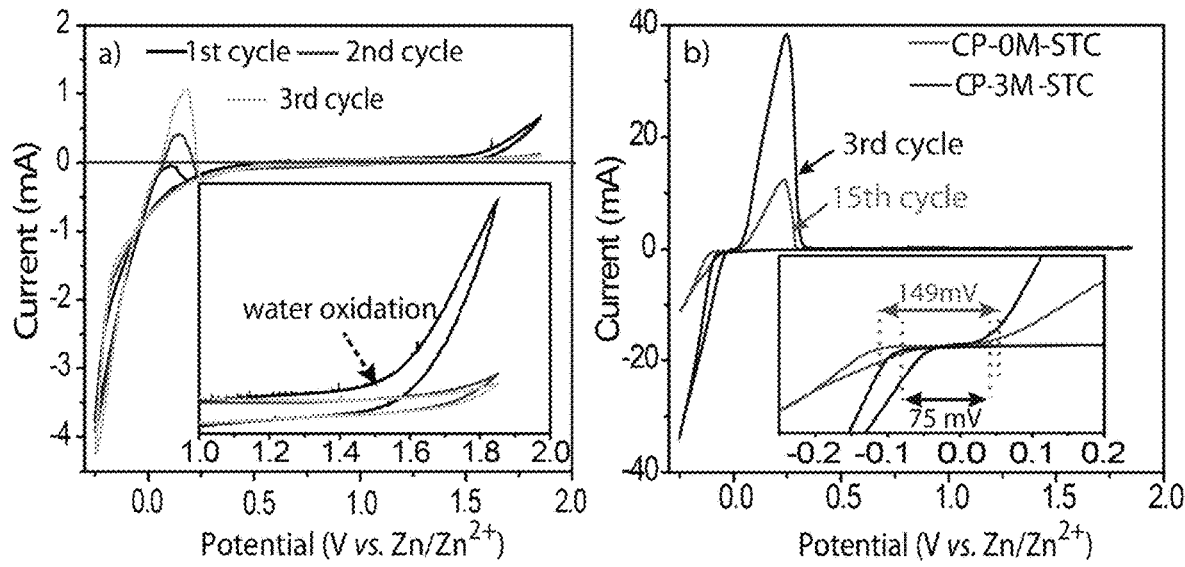
*Fig. 7*
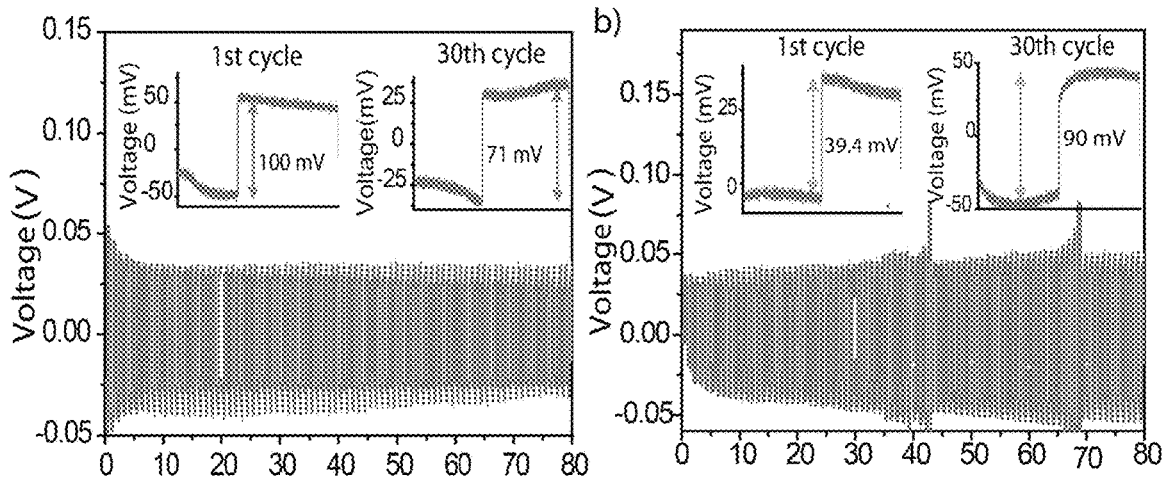
*Fig. 8a*  *Fig. 8b*

METAL ION BATTERY HAVING IONOMER MEMBRANE SEPARATOR AND FREE-STANDING ELECTRODE

CROSS REFERENCE TO RELATED APPLICATIONS

This application is a National Stage application of PCT/IN2020/050109, filed on Feb. 4, 2020, which claims priority to Indian Application No. 201911004481, filed on Feb. 5, 2019, the entire contents of which are incorporated herein by reference in its entirety.

FIELD OF THE INVENTION

The present invention relates to a metal ion battery as an efficient energy storage device having ionomer membrane separator and free-standing electrode. More particularly, the present invention provides a $Zn/V_2O_5$ battery having cation selective ionomer membrane and free-standing electrode.

BACKGROUND AND PRIOR ART OF THE INVENTION

Development of energy storage devices is vital for storing the energy output from renewable sources. In this context, Lithium ion battery (LIB) technology is the most matured one. However, the use of organic electrolyte in LIBs hinders its large scale application. Aqueous ion batteries (AIBs) are considered as one of the promising energy storage devices which can overcome several challenges associated with LIBs such as flammable nature, high cost and tedious fabrication procedures. In this regard, there is a growing interest in Zn based AIBs (ZAIBs). Transition metal oxides (TMO) e.g. $MnO_2$, $V_2O_5$ have emerged as potential cathode materials for ZAIBs (Zn/TMO battery). However, the technology of ZAIBs is still in its infancy due to the less capacity and poor life span of the battery. Introducing some additive salt in the electrolyte although improve life span of battery, however, it often comes at the expense of low capacity. Therefore it is indeed of great importance to find out a strategy to increase the life span of ZAIBs without compromising the capacity. In conventional ZAIBs a porous membrane is used as a separator. The transport of both the cations and anions imparts resistance into the system which deteriorates the battery performance during long term cycling. Therefore, use of cation selective membrane can be a viable solution which can augment the transport of $Zn^{2+}$ and at the same time enhance the cycle life of the battery. Also, another major intricacy in the performance of battery comes from the conventional way of electrode fabrication which reduces the number of active sites for charge storage. Therefore, to achieve high capacity ZAIBs, it is also important to adopt a judicial strategy for the electrode fabrication, which can ensure the maximum utilization of active centers for charge storing.

Article titled "Reversible aqueous zinc/manganese oxide energy storage from conversion reactions" by Huilin Pan et al. published in *Nature Energy* volume 1, Article number: 16039 (2016) reports demonstration of a highly reversible zinc/manganese oxide system in which optimal mild aqueous $ZnSO_4$ based solution is used as the electrolyte, and nanofibres of a manganese oxide phase, $\alpha$-$MnO_2$, are used as the cathode.

Article titled "Aqueous rechargeable zinc/sodium vanadate batteries with enhanced performance from simultaneous insertion of dual carriers" by Fang Wan et al. published in Nature Communications volume 9, Article number: 1656 (2018) reports a highly reversible zinc/sodium vanadate system, where sodium vanadate hydrate nanobelts serve as positive electrode and zinc sulfate aqueous solution with sodium sulfate additive is used as electrolyte. Different from conventional energy release/storage in zinc-ion batteries with only zinc-ion insertion/extraction, zinc/sodium vanadate hydrate batteries possess a simultaneous proton, and zinc-ion insertion/extraction process that is mainly responsible for their excellent performance, such as a high reversible capacity of 380 mAh $g^{-1}$ and capacity retention of 82% over 1000 cycles. Moreover, the quasi-solid-state zinc/sodium vanadate hydrate battery is also a good candidate for flexible energy storage device.

Although a significant progress has been made towards the advancement of ZAIBs, however, it is still challenging to converge all the desired aspects of an ideal energy storage device such as high capacity, high rate capability and long cycle life. Transition metal oxides are getting considerable interest as efficient cathode material for ZAIBs due to high theoretical capacity and several oxidation states. However, those materials often exhibit limited capacity which is far behind than the theoretically expected value. This inefficient performance of TMO based ZAIBs can be attributed to the reasons, such as 1. Conventional electrode fabrication strategy (by mixing insulating polymer binder) impose electrical resistance in the electrode which negatively affect the power output of the device. 2. Physical mixing of conductive additives with redox active materials fails to provide homogeneous electrical conductivity throughout the electrode which reduce the number of accessible redox active sites.

3. In conventional ZAIB using porous separators, the diffusion of discharge product through the porous separator may poison the anode which can also deteriorate the life span of the battery.

Therefore, thus there is a need in the art to adopt a judicial strategy for fabrication of the device which can simultaneously improve the discharge capacity as well as cycle life of the battery in order to realize high performance ZAIBs.

OBJECTIVES OF THE INVENTION

The main objective of the present invention is to provide an energy storage device having ionomer membrane separator and free-standing electrode.

Another objective of the present invention is to provide fabrication of the energy storage device having ionomer membrane separator and free-standing electrode which can furnish all the aspects of efficient energy storage device in terms of energy density, power density and cycle life.

SUMMARY OF THE INVENTION

Accordingly, the present invention provides an energy storage device having ionomer membrane separator and free-standing electrode.

The present invention provides an energy storage device comprising Zn as an anode, electrodeposited $V_2O_5$ on functionalized carbon as a cathode, sulfonated tetrafluoroethylene copolymer (STC) as a cation selective ionomer membrane separator and $ZnSO_4$ as an electrolyte. More specifically, in the present invention, the STC is tetrafluoroethylene-perfluoro-3,6-dioxa-4-methyl-1-octenesulfonic acid copolymer (Nafion) that functions as separator.

The ionomer membrane is selected from the group comprising of STC, polyvinyl sulfonic acid, polystyrene sulfonic acid, polyAMPs.

The free-standing electrode is selected from various redox active material group comprising of $V_2O_5$, $MnO_2$, $Co_3O_4$, which can be electrodeposited on various conducting substrate group comprising of carbon fiber paper, carbon felt, flexible graphite, FTO glass, CNT-buckypaper.

The device is battery, more specifically Zn based aqueous ion batteries (ZAIBs).

The present invention further provides a process for fabrication of the energy storage device comprising the steps of:
a. subjecting a piece of a pristine carbon paper (pCP) to anodization or electrochemical functionalization (hydrophilic functional groups containing oxygen) by applying a bias potential of 10 V to 20 V for 5 to 10 mins in a two-electrode cell assembly in an electrolyte solution to obtain a functionalized carbon paper;
b. carrying electrochemical deposition on the functionalized carbon paper with an active material to obtain an active material deposited carbon paper; and
c. assembling the device by using the active material deposited carbon paper as cathode, a piece of metal foil as an anode and an electrolyte impregnated ionomer membrane as a separator cum electrolyte.

BRIEF DESCRIPTION OF THE DRAWINGS

FIG. 2: (a) Low, (b) high magnification FE-SEM image of V-CP sample, (c) TEM image of $V_2O_5$ particle taken from V-CP specimen (d) de-convoluted XPS spectra of vanadium and oxygen in V-CP specimen.

FIG. 3: (a) Ionic conductivity of 3M-STC and other porous 3M-Y membranes at 30° C. temperature, (b) $\ln\sigma$ vs 1/T plot for 3M-STC and 3M-Y porous membranes.

FIG. 7: CV profiles corresponding to the platting/stripping behaviour of Zn in (a) CP-0M-STC cell at 10 mV s$^{-1}$ scan rate, (b) CP-0M-STC and CP-3M-STC at 10 mV s$^{-1}$ scan rate of 15th and 3rd cycle, respectively.

DETAILED DESCRIPTION OF THE INVENTION

Figure 1:
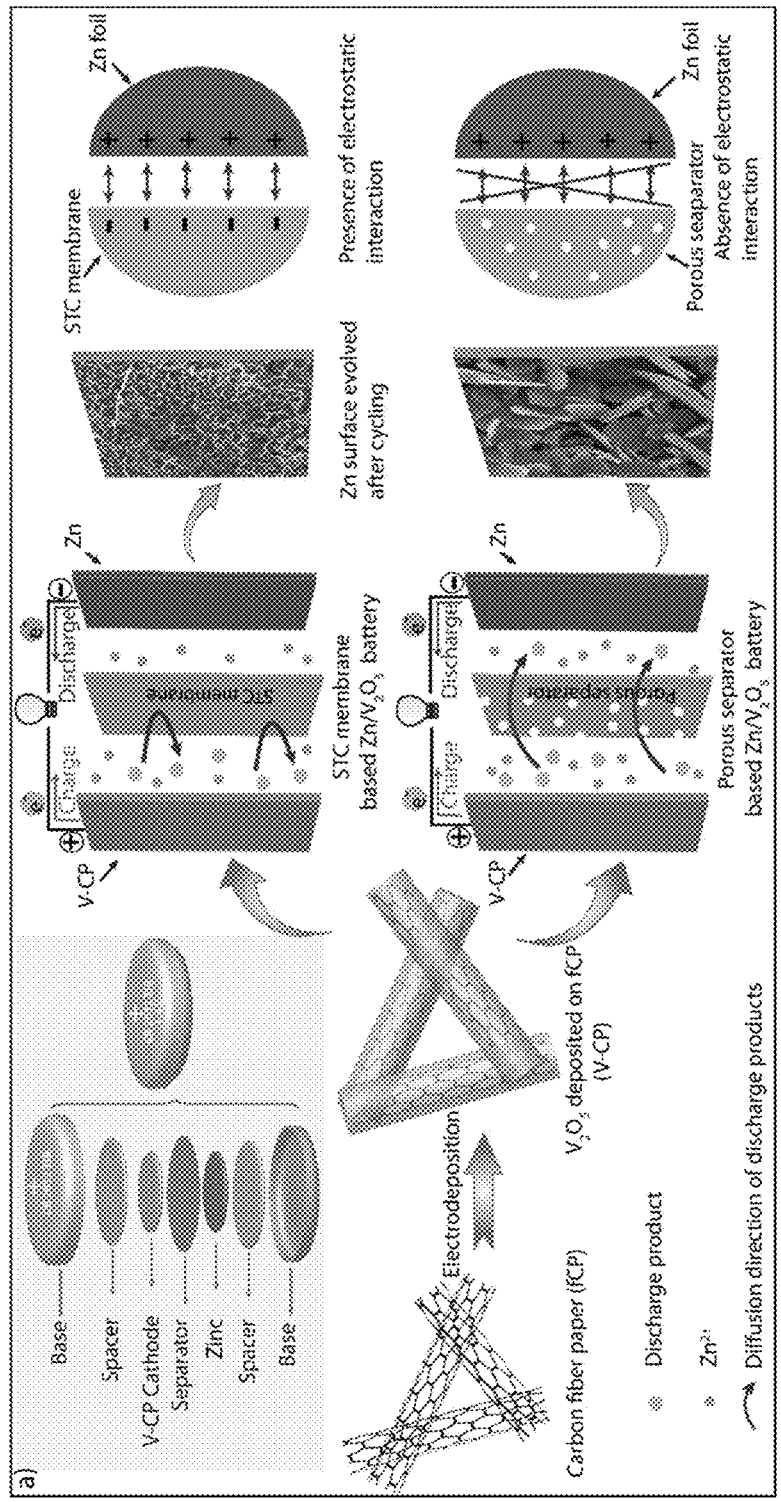
FIG. 1: Schematic representation of the different $Zn/V_2O_5$ battery configurations containing STC ionomer membrane and conventional porous membrane separator.
Figure 4A:
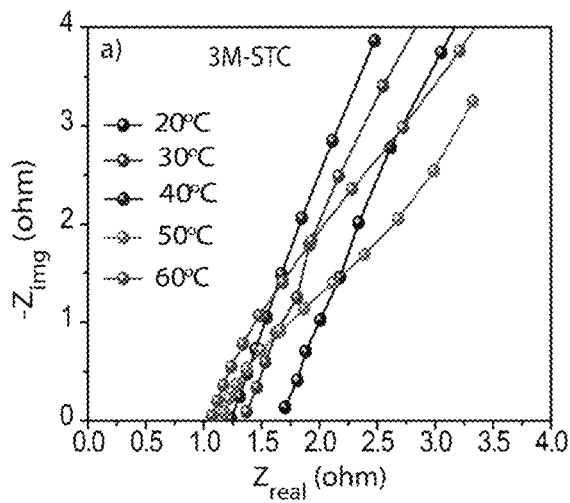
FIG. 4: Nyquist plots of (a) 3M STC, (b)3M-Glass fibre, (c) 3M-Filter paper, (d) 3M-PolypropylenePolypropylene membranes at 20° C. to 60° C.
Figure 4B:
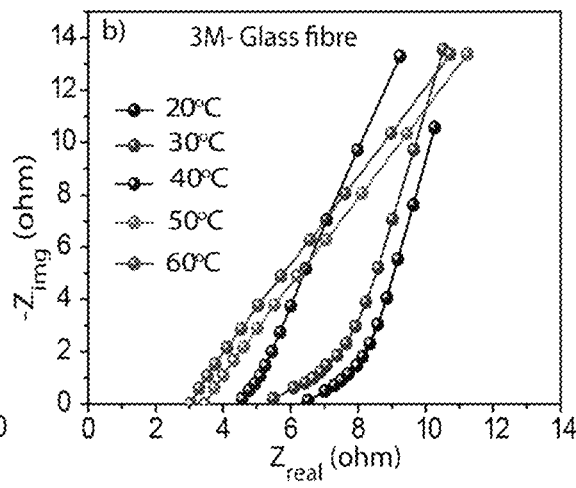
Figure 4C:
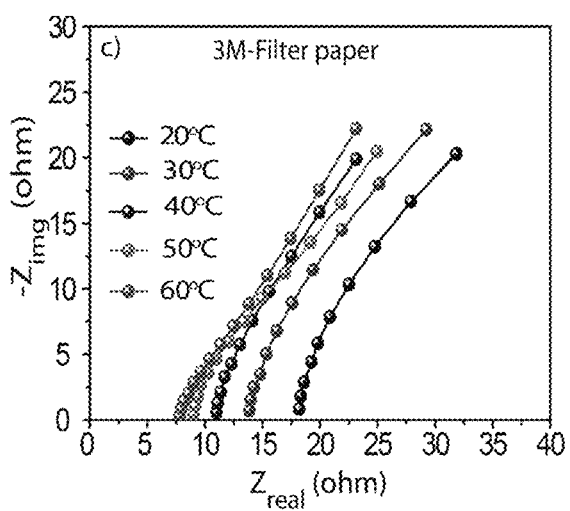
Figure 4D:
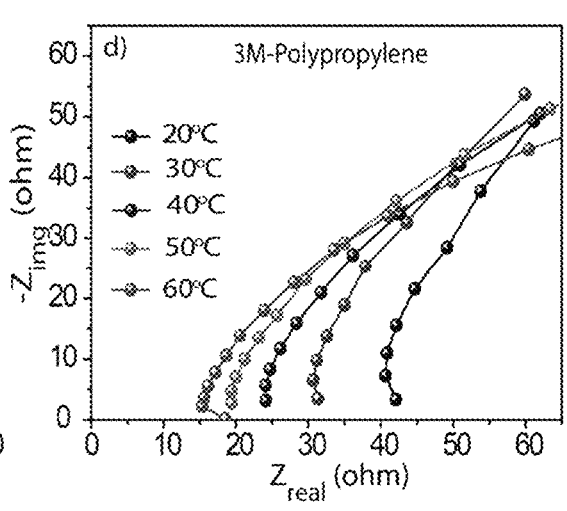

The invention will now be described in detail in connection with certain preferred and optional embodiments, so that various aspects thereof may be more fully understood and appreciated.

The present invention provides an energy storage device having ionomer membrane separator and free-standing electrode and fabrication of the device thereof.

The ionomer membrane is selected from the group comprising of STC, polyvinyl sulfonic acid, polystyrene sulfonic acid, polyAMPs.

More specifically, in the present invention, the STC is tetrafluoroethylene-perfluoro-3,6-dioxa-4-methyl-7-octene-sulfonic acid copolymer (Nafion) that functions as separator.

The free-standing electrode is selected from the various redox active material group comprising of $V_2O_5$, $MnO_2$, $Co_3O_4$, which can be electrodeposited on various conducting substrate group comprising of carbon fiber paper, carbon felt, flexible graphite, FTO glass, buckypapar, carbontape peeled off flexible graphite.

The device is battery, more specifically Zn based aqueous ion batteries (ZAIBs).

In an embodiment, the present invention provides an energy storage device comprising Zn as anode, $V_2O_5$ electrodeposited on functionalized carbon as cathode, STC as separator and $ZnSO_4$ as electrolyte. The strategy adopted in this invention can be extended to several other cathode materials such as $MnO_2$, $Co_3O_4$, redox active conducting polymers. Different other ionomer membranes separator can be designed by using polyvinyl sulfonic acid, polystyrene sulfonic acid, polyAMPs ionomer which can perform well in zinc ion battery (with several other electrolyte such as $Zn(CF_3SO_3)_2$ and $ZnCl_2$) as well as in aluminium ion battery (Al as anode, aqueous solution of $Al_2(SO_4)_3$ as electrolyte), magnesium battery (Mg as anode, aqueous solution of $Mg(TFSI)_2$ or $MgSO_4$ as electrolyte). Moreover, it can be used for the fabrication of flexible battery just by replacing the carbon fiber paper with other flexible substrate such as flexible graphite, carbon tape peeled off flexible graphite, flexible FTO, carbon felt, CNT-buckypaper.

In an embodiment, the device further comprises of a free-standing electrode.

In another embodiment, the battery exhibits outstanding cycling stability with a retention of 85% after 1300 cycles at 5 A g$^{-1}$ current density and with a retention of 88% after 1800 cycles at 10 A g$^{-1}$ current density.

In another embodiment, the battery provides an energy density of 250-400 W h kg$^{-1}$.

The present invention further provides a process for fabrication of the energy storage device comprising the steps of:
a. subjecting a piece of a pristine carbon paper (pCP) to anodization or electrochemical functionalization (hydrophilic functional groups containing oxygen) by applying a bias potential of 10 V to 20 V for 5 to 10 mins in a two-electrode cell assembly in an electrolyte solution to obtain a functionalized carbon paper;
b. carrying electrochemical deposition on the functionalized carbon paper with an active material to obtain an active material deposited carbon paper; and c. assembling the device by using the active material deposited carbon paper as cathode, a piece of metal foil as an anode and an electrolyte impregnated ionomer membrane as a separator cum electrolyte.

In a further embodiment, the active material is $V_2O_5$, the metal is Zn and the ionomer membrane is STC.

In another embodiment, in step (a) the electrolyte is $Na_2SO_4$ and in step (c) the electrolyte is $ZnSO_4$.

For the fabrication of ZAIBs, a $Zn^{2+}$ impregnated STC ionomer membrane is integrated with a free standing $V_2O_5$ based positive electrode. The presence of STC ionomer membrane enhances the kinetics of $Zn^{2+}$ and at the same time hinders the poisoning of negative electrode by diffusion of discharge product from positive electrode. The positive electrode is prepared by adopting electrodeposition technique which affords the maximum contact of the active material with conductive substrate, and thus ameliorate the charge storage capacity of the electrode. $V_2O_5$ is electrodeposited over a pre-functionalized carbon paper and used as a free-standing positive electrode. As a combined effect STC ionomer based $Zn/V_2O_5$ battery delivers very high capacity as well as long cycle life.

FIG. 1 depicts schematic representation of the different $Zn/V_2O_5$ battery configurations containing STC ionomer membrane and conventional porous membrane separator.

FIG. 2 depicts physical characterization of the V-CP freestanding electrode. The morphology of the V-CP electrode is investigated by FE-SEM analysis. In FIGS. 2a and b, the roughness on the surface of the carbon fiber indicates the growth of $V_2O_5$ nano-structure on it. The large interlayer spacing of $V_2O_5$ (0.9 nm) in V-CP sample is observed from the TEM image (FIG. 2c), which enable the co-insertion/extraction of $Zn^{2+}$ and $H^+$ during the charge/discharge process. In the XPS spectra (FIG. 2d) of the V-CP specimen, the peaks located at 517.3 eV and 525.2 eV for V2p3/2 and V2p1/2 doublet correspond to the +5 oxidation state of V.23 The presence of +4 oxidation state is also detected from the peaks appeared at binding energy of 515.9 eV and 523.8 eV. In the same figure the fine spectra of O1s peak indicates that in the V-CP sample, oxygen is present in two different chemical environment. The peak located at 530.0 eV is attributed to the oxygen atom coordinated with V (V—O) in $V_2O_5$. Another O1s peak located at 532.6 eV signifies the existence of H—O in the carbon fiber paper. The presence of this peak is obvious due to the relatively low annealing temperature which is not sufficient to remove all the functional groups from the CP.

In the selection of the separator, the ionic conductivity of the 3M-STC ionomer membrane is compared with other conventional porous 3M-Y membranes at an ambient temperature of 30° C. (FIG. 3a). From the FIG. 3a, it is observed that 3M-STC displays ionic conductivity 2.6 mS $cm^{-1}$, which is higher than 3M-Polypropylene and 3M-Filter paper counterparts. The slightly higher ionic conductivity (2.8 mS $cm^{-1}$) of 3M-Glass fibre due to its better wettability and intrinsic porous nature.

The activation energy of the membranes towards the ion conduction is calculated from slop of the $\ln\sigma$ vs 1/T plot (FIG. 3b) within a temperature range of 20° C. to 60° C. and the conductivity is observed to be linearly dependent with increase in temperature. The 3M-STC membrane (FIG. 3b) exhibits lowest activation energy compared to all other porous membranes (the corresponding Nyquist plots are given in FIG. 4). This observation indicates that the higher ionic conductivity along with low activation energy of the 3M-STC ionomer membrane have decisive role in the performance of the ZAIB assembled with STC membrane as separator.

Figure 5:
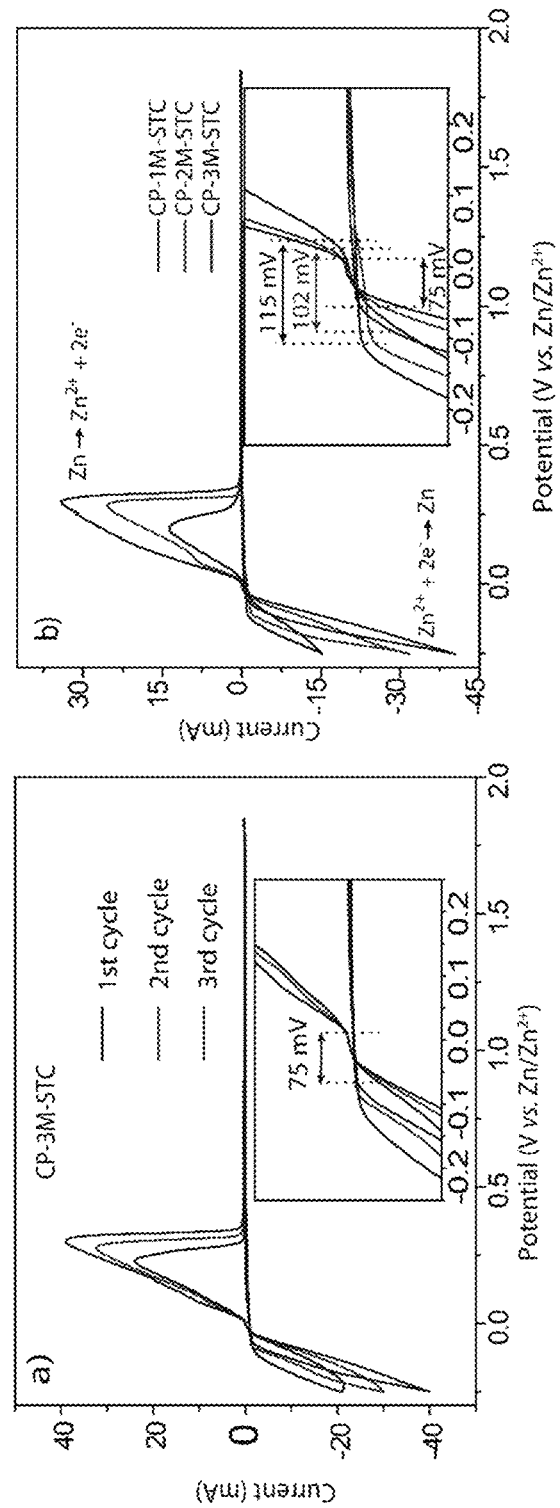
FIG. 5: CV profiles corresponding to the platting/stripping behaviour of Zn in CP-XM-STC cells at 5 mV s$^{-1}$ scan rate.

The effect of various membrane separators on the platting/stripping behaviour of Zn is analyzed by cyclic voltammetry experiments at a scan rate of 5 my $S^{-1}$ in Zn/CP cell configuration. The overpotential measured for the Zn plating/stripping on CP in CP-3M-STC (FIG. 5a) cell is only 75 mV (at 5 mV $s^{-1}$). A noticeable improvement in the current density during CV analysis of CP-3M-STC (from 1st to 3rd cycle) (FIG. 5a) indicates the ability of STC ionomer to augment the transport of $Zn^{2+}$ in the respective cell. The concentration of the electrolyte is also observed to play a crucial role in the electrochemical reaction of Zn. When the salt concentration is increased to 3M, the corresponding overpotential for Zn plating/stripping is reduced to 75 mV from 115 mV along with two fold improvement in current densities for both plating and stripping reactions (FIG. 5b). At higher electrolyte concentration, the reduced solvation effect due to the less number of water molecules surrounding $Zn^{2+}$, facilitates the transport of $Zn^{2+}$, suggesting better reversibility of the associated electrochemical reactions.

Figures 6A, 6B, 6C:
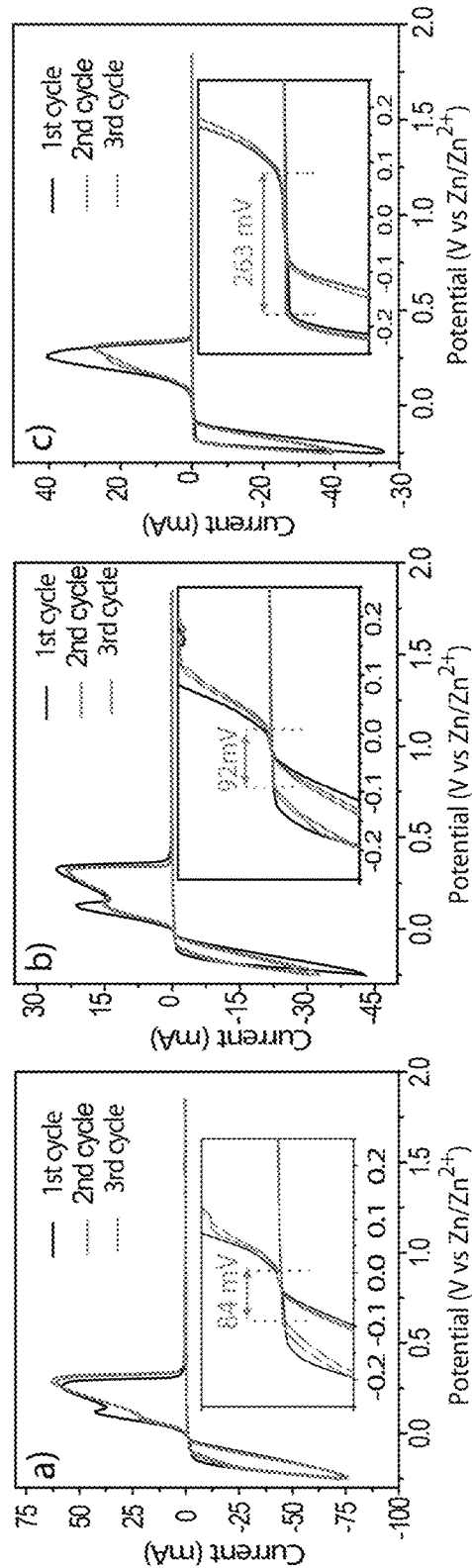
FIG. 6: CV profiles corresponding to the platting/stripping behaviour of Zn in (a) CP-3M-Glass fibre, (b) CP-3M-Filter paper, (c) CP-3M-Polypropylene cells at 5 mV s$^{-1}$ scan rate.

FIGS. 6a to 6c depict all the porous membrane based CP-3M-Y cells display higher overpotential for Zn plating/stripping. The positive attribute of the 3M-STC ionomer membrane can be correlated with the higher ionic conductivity and low activation energy as obtained from the ionic conductivity measurement. The magnitude of the overpotential for Zn plating/stripping in CP-3M-Y cells comprising porous separators follow the similar trend of ionic conductivity of the respective membranes (FIG. 3a). The better platting/stripping behaviour of Zn as observed from FIG. 5a also indicates the better interface formed by the STC ionomer membrane with the respective electrodes (Zn and CP).

As observed from FIG. 7a (CP-0M-STC cell), there is no significant positive current response during the oxidation of Zn in the $1^{st}$ cycle of the CV. From the $1^{st}$ to $3^{rd}$ cycle, the current density corresponding to Zn oxidation is found to increase gradually. This indicates some sort of Zn plating/stripping is occurring even in absence of $ZnSO_4$ in the system. The acidic nature of the STC ionomer in OM-STC membrane causes dissolution of the Zn from the negative electrode which eventually take part in the plating/stripping reaction on the working electrode. FIG. 7b shows that after several cycles the CV profile of the CP-0M-STC cell ($15^{th}$ cycle) is appeared similar to that of CP-3M-STC cell ($3^{rd}$ cycle). However, the low current density (after $15^{th}$ cycles) and higher overpotential (149 mV) indicates the inferior kinetics of the Zn plating/stripping in CP-0M-STC cell compared to CP-3M-STC cell.

From FIG. 7a it is observed that another distinct redox peak beyond 1.5V in the 1st cycle of CV, which appears due to the oxidation of water. However, this peak starts to diminish with the evolution of oxidation peak corresponding to Zn. This clearly suggest that presence $Zn^{2+}$ not only provide better reversibility to the associated electrochemical reactions, but also increases the anodic stability of electrolyte, dramatically.

Figure 8C:
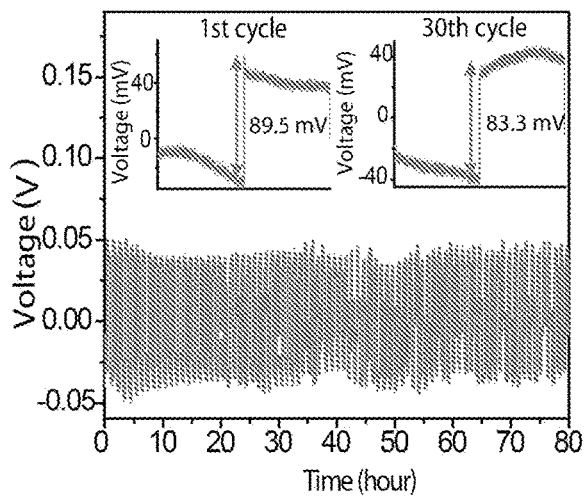
FIG. 8: Galvanostatic cycling of Zn/Zn symmetric cell at 0.1 mA cm$^{-2}$ current density in presence of (a) 3M-STC, (b) 3M-Glass fibre, (c) 3M-Filter paper, and (d) 3M-Polypropylene.
Figure 8D:
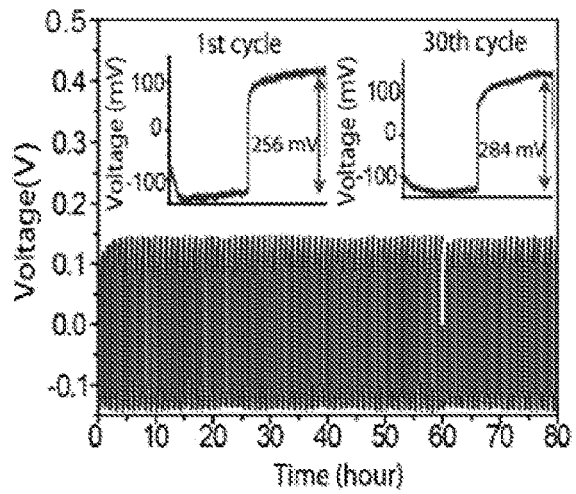

FIG. 8 displays the voltage profiles at a constant charge/discharge current density of 0.1 mA $cm^{-2}$. The symmetric cell comprising 3M-STC ionomer membrane exhibits better reversibility of Zn plating/stripping compared to other conventional porous membranes counterparts. From the enlarged part at various cycles, the 3M-STC displays a significant decrease of overpotential (71 mV at 30th cycle) upon cycling. Gradual enhancement in the charge/discharge voltage separation in case of other porous 3M-Y membranes further indicates the superiority of STC ionomer membrane separator.

Figure 9A:
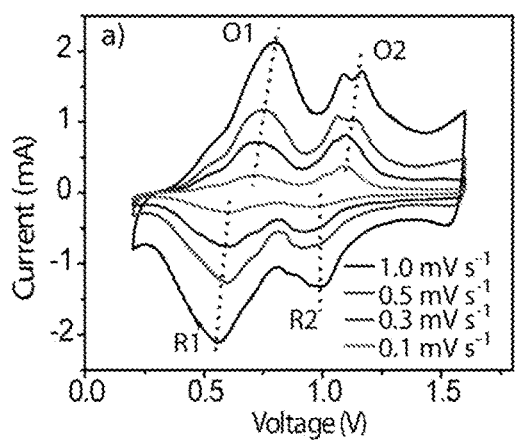
FIG. 9: (a) CV plot scanning from 0.1 mVs$^{-1}$ to 1.0 mVs$^{-1}$, (b) Log i vs Log v plot, (c) rate capability plot, (d) charge-discharge capacity of V-CP electrode in V-3M-STC coin cell.
Figure 9B:
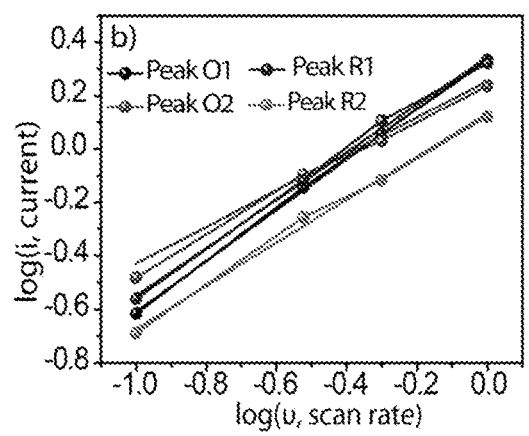

FIG. 9a displays the current response in the voltammogram at different scan rate ranging from 0.1 mV s$^{-1}$ to 1.0 mV s$^{-1}$. The appearance of multiple anodic and cathodic peaks can be attributed to the multistep reversible intercalation of $Zn^{2+}$ into the V-CP cathode. The plot of log (i) vs log (v) in FIG. 9b shows the current dependence on the scan rate and from the equation i=a v$^b$ the b-values corresponding to the peak O1, O2, R1 and R2 are obtained as 0.94, 0.71, 0.89 and 0.80, respectively. A significantly higher b-value than 0.5 indicates that the charge storage mechanism in V-CP cathode is surface controlled and capacitive in nature.

This pseudocapacitive charge storage behavior of V-CP cathode augments the intercalation/deintercalation kinetics of $Zn^{2+}$, which is highly desirable to enhance the power output of energy storage device.

Figure 9C:
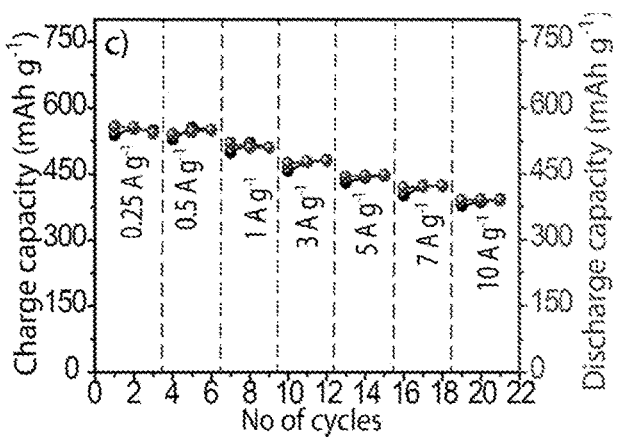
Figure 9D:
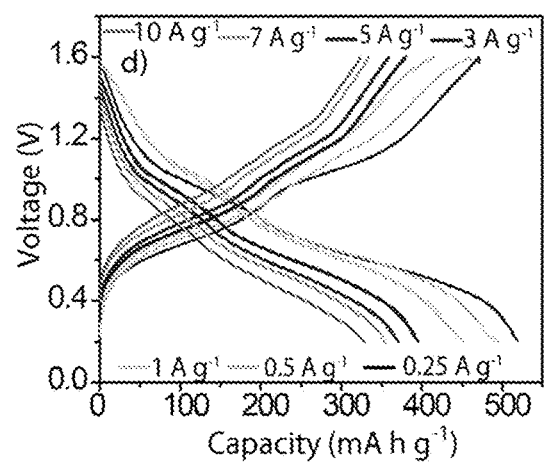

The galvanostatic charge-discharge experiment is carried out at the current density of 0.25 A g$^{-1}$ to 10 A g$^{-1}$. An average discharge capacity of 510 mAh g$^{-1}$ is obtained at a current density of 0.25 A g$^{-1}$ (FIGS. 9c and 9d), which is sufficiently higher than all ZAIBs reported so far. The V-3M-STC battery delivers an average discharge capacity of 330 mAh g$^{-1}$ when it is discharged at a very high current density of 10 A g$^{-1}$ (40 times higher than the lowest current density of 0.25 A g$^{-1}$), with 60% retention of the capacity obtained at 0.25 A g$^{-1}$. The performance of the V-3M-STC cell attributed to both the V-CP cathode and use of the STC ionomer membrane. In the V-CP cathode the carbon fiber skeleton provides an interconnected pathway which facilitates the transport of electrons throughout the electrode. The thin and uniform deposition of $V_2O_5$ over the carbon fiber increases the number of surface redox active sites which augments the rate of redox reaction and the $Zn^{2+}$ uptake capacity of the V-CP electrode, simultaneously. Therefore, the combined effect of the higher transport rate of $Zn^{2+}$ through the STC membrane and the surface controlled intercalation/deintercalation of $Zn^{2+}$ in the V-CP cathode improve the capacity as well as rate capability of the V-3M-STC cell.

Figure 10A:
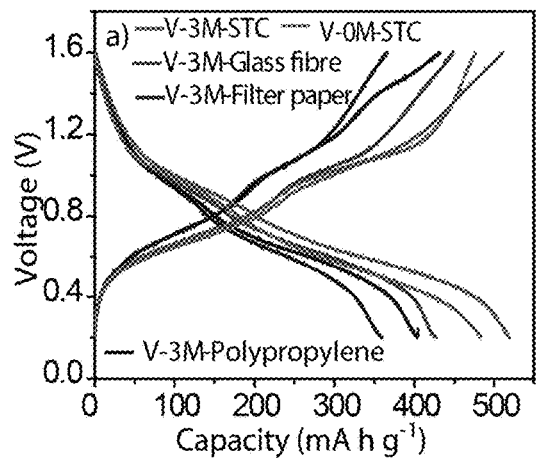
FIG. 10: (a) Charge/discharge profiles of V-XM-STC and V-3M-Y batteries at 0.25 A g$^{-1}$ current density, (b) cycling stability and coulombic efficiency of V-3M-STC battery at 10 A g$^{-1}$ current density, (c)cycling stability comparison of V-3M-STC battery with other V-XM-Y batteries, (d) Ragone plots for different ZAIBs along with V-3M-STC battery.
Figure 10B:
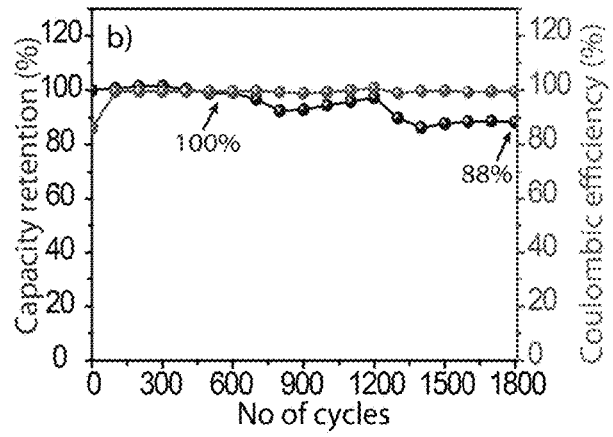
Figure 10C:
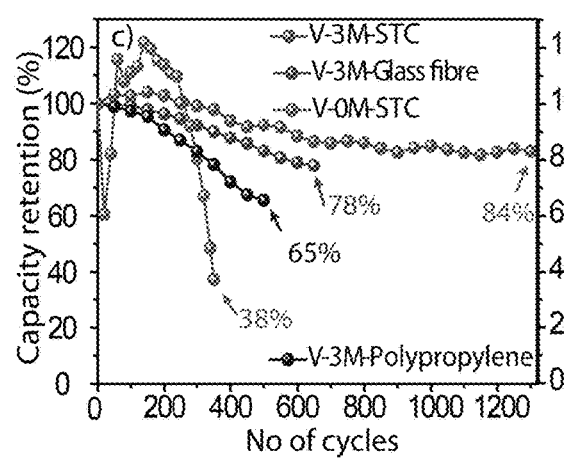
Figure 10D:
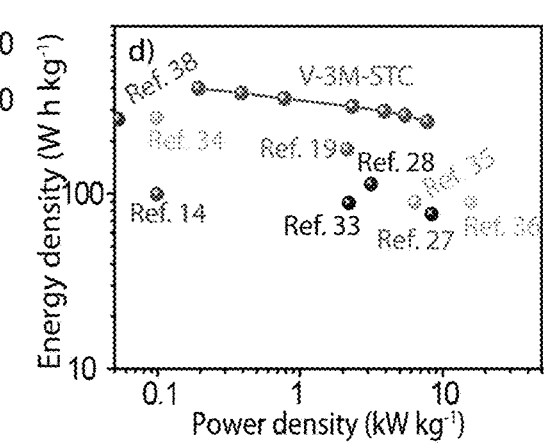
Figure 11:
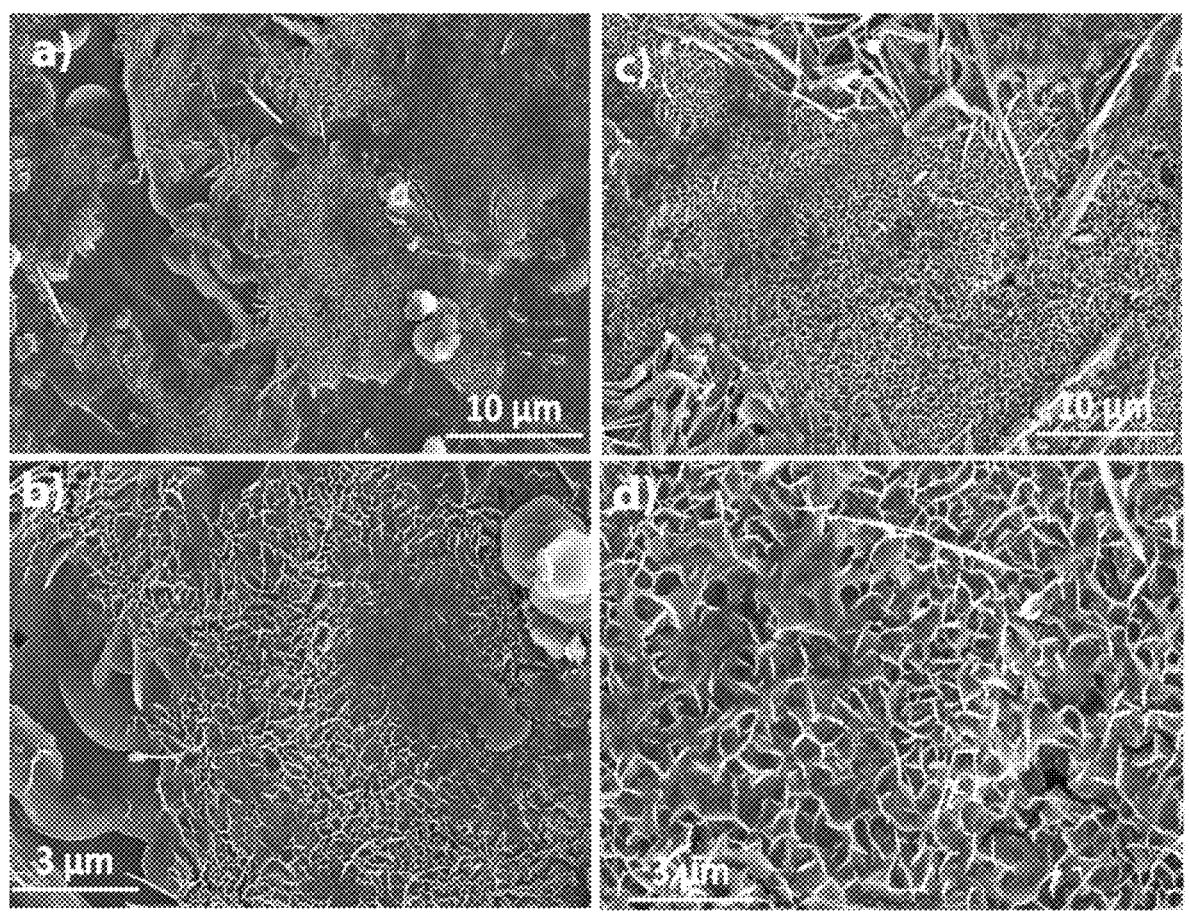
FIG. 11: Surface morphology of the cycled Zn anode of V-3M-STC cell (a) and (b) after 500 stability cycle, (c) and (d) after 1300 stability cycle at current density of 5 A g$^{-1}$.
Figure 12A:
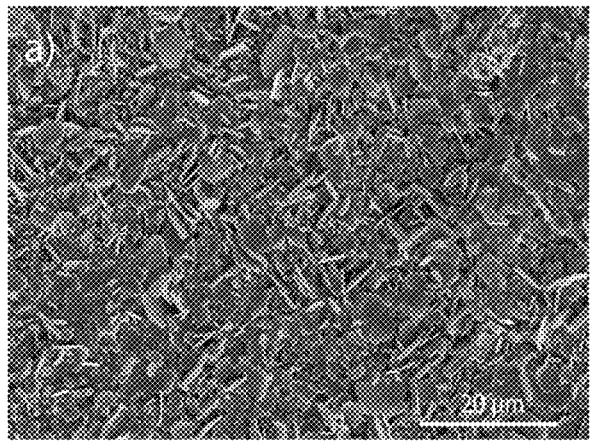
FIG. 12: Surface morphology of the cycled Zn anode of V-3M-Polypropylene cell (a) and (b) after 500 stability cycle; EDAX spectra of Zn foil of (c) V-3M-STC cell (after 1300 cycle), (d) V-3M-Polypropylene cell (after 500 cycle).
Figure 12B:
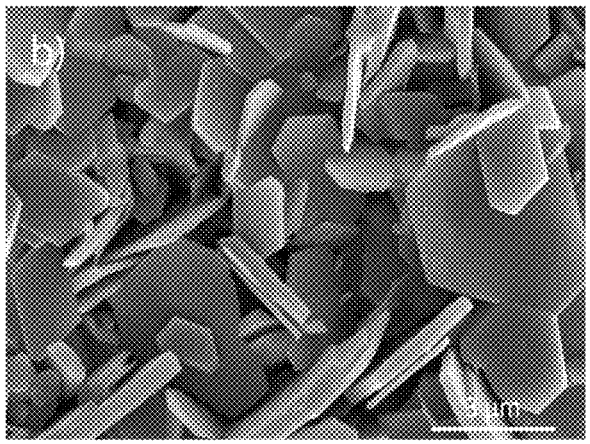
Figure 12C:
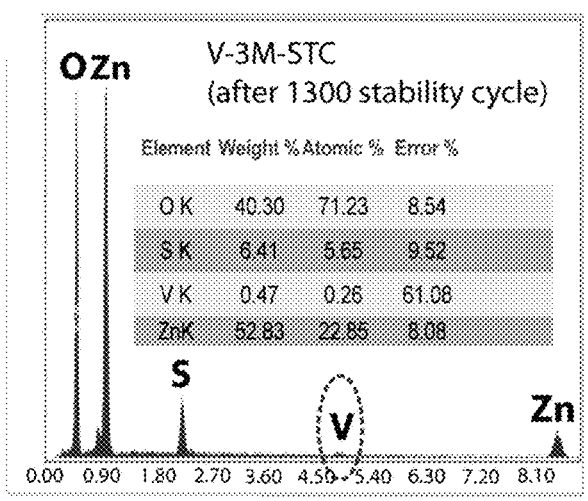
Figure 12D:
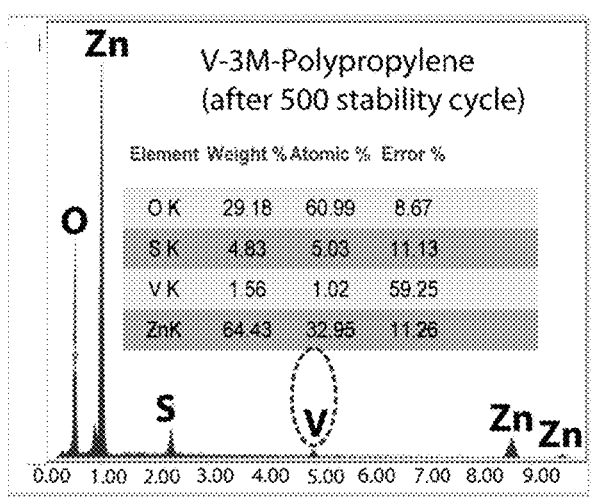

$Zn/V_2O_5$ batteries are fabricated with conventional porous membranes. The discharge capacity of V-3M-STC cell is compared with that of porous membrane counterparts in FIG. 10a. The highest discharge capacity of the V-3M-STC attributed to the enhanced transport rate of $Zn^{2+}$ through cation selective STC ionomer, which strongly correlated with plating/stripping behaviour of Zn in the corresponding cells. Apart from high discharge capacity, the V-3M-STC battery also exhibits outstanding cycling stability with a retention of 85% (after 1300 cycles) and 88% (after 1800 cycles) at 5 A g$^{-1}$ and 10 A g$^{-1}$ current density, respectively (cyclic stability at 10 A g$^{-1}$ current density is given in FIG. 10b). FIG. 10c displays the highest cycling stability of V-3M-STC cell compared to all other conventional porous membranes based counterparts, at a current density of 5 mA cm$^{-2}$. The Ragone plot representing the energy and power density of the V-3M-STC battery is given in FIG. 10d. The outstanding energy and power density of the device further indicate its practical suitability. At two different power densities of 195 and 7800 W kg$^{-1}$ the device delivers high energy densities of 398 and 257 W h kg$^{-1}$ (considering the average voltage of 0.78 V). The surface morphology of the Zn foil is analysed after 500 and 1300 stability cycles to find out the reason for the higher stability of V-3M-STC cell. From FIG. 11a it is observed that the Zn foil retains a nearly flat surface in case of V-3M-STC cell, after 500 cycle. However, at high magnification, a nanoflakes like growth pattern is observed to be embedded in the Zn surface (FIG. 11b). After 1300 cycling the surface morphology of the Zn is changed into a porous interconnected thin nanowalls like structure (FIGS. 11c and 11d), which evolved due to exfoliation of the embedded nanoflakes upon prolonged cycling. In FIGS. 12a and 12b, non-porous dense particles are observed on the Zn surface of porous separator based cell (V-3M-Polypropylene). The EDAX analysis are also carried out for the cycled Zn (anode) corresponding to the V-3M-Polypropylene and V-3M-STC cell. The vanadium signal is evidently higher in case of Polypropylene based cell (FIG. 12d) than that in the cell with STC ionomer membrane (FIG. 12c). This implies that cation selective STC ionomer act as a barrier to the diffusion of the discharge product towards negative electrode (schematically presented in FIG. 1). In case of porous membrane, discharge products pass through the separator towards anode and poison the anode surface, which eventually declines the life span of the V-3M-Polypropylene cell.

Table 1 shows the comparison data of the capacity, cyclic stability and voltage window of the V-3M-STC battery with some of rechargeable batteries (ZAIB and Li—S battery).

| No | Cathode electrode material | Electrolyte | Separator | Discharge capacity | Cycling stability | Voltage |
|---|---|---|---|---|---|---|
| 1 | $V_2O_5$ | 21m LiTFSI and 1m $Zn(CF_3SO_3)_2$ | Filter paper | 242 mAh g$^{-1}$ @ 0.05 A g$^{-1}$ | 83% retention after 2000 cycles @2 Ag$^{-1}$ | 0.2 to 1.6 V |
| 2 | $ZnMn_2O_4$ | 3M $Zn(CF_3SO_3)_2$ | Filter paper | 150 mAh g$^{-1}$ @ 0.05 A g$^{-1}$ | 94% retention after 500 cycles @ 0.5 Ag$^{-1}$ | 0.8 to 2.0 V |
| 3 | $MnO_2$/CFP | 2M $ZnSO_4$ + 0.2M $MnSO_4$ | — | 70 mAh g$^{-1}$ @ 1.9 A g$^{-1}$ | 100% retention after 10000 cycles @ 1.9 Ag$^{-1}$ | 1.0 to 1.8 V |
| 4 | $V_2O_5 \cdot nH_2O$ | 3M $Zn(CF_3 + SO_3)_2$ | Glass fibre membrane | 381 mAh g$^{-1}$ @ 0.06 A g$^{-1}$ | 71% retention after 900 cycles @ 6 Ag$^{-1}$ | 0.2 to 1.6 V |

-continued

| No | Cathode electrode material | Electrolyte | Separator | Discharge capacity | Cycling stability | Voltage |
|---|---|---|---|---|---|---|
| 5 | $Zn_2V_2O_7$ | 1M $ZnSO_4$ | Glass fibre membrane | 227.8 mAh $g^{-1}$ @0.3 A $g^{-1}$ | 85% retention after 1000 cycles @ 4 $Ag^{-1}$ | 0.4 to 1.4 V |
| 6 | $Zn_{0.25}V_2O_5 \cdot nH_2O$ | 1M $ZnSO_4$ | — | 220 mAh $g^{-1}$ @4.5 A $g^{-1}$ | 80% retention after 1000 cycles @ 4.5 $Ag^{-1}$ | 0.5 to 1.4 V |
| 7 | $V_2O_5$ | 1M $ZnSO_4$ | Glass fibre membrane | 224 mAh $g^{-1}$ @0.1 A $g^{-1}$ | 54% retention after 400 cycles @ 1 $Ag^{-1}$ | 0.4 to 1.4 V |
| 8 | $VO_2$ | 3M $Zn(CF_3+SO_3)_2$ | Glass fibre membrane | 357 mAh $g^{-1}$ @0.1 A $g^{-1}$ | 100% retention after 50 cycles @ 0.1 $Ag^{-1}$ | 0.3 to 1.5 V |
| 9 | $Na_{0.33}V_2O_5$ | 3M $Zn(CF_3SO_3)_2$ | Glass fibre membrane | 367.1 mAh $g^{-1}$ @0.1 A $g^{-1}$ | 93% retention after 1000 cycles @ 1.0 $Ag^{-1}$ | 0.2 to 1.6 V |
| 10 | $H_2V_3O_8$ NW/graphene | 3M $Zn(CF_3SO_3)_2$ | Glass fibre membrane | 394 mAh $g^{-1}$ @0.1 | 87% retention after 2000 cycles @ 6.0 $Ag^{-1}$ | 0.2 to 1.6 V |
| 11 | $V_2O_5$ | 3M $Zn(CF_3SO_3)_2$ | Glass fibre membrane | 470 mAh $g^{-1}$ @0.2 A $g^{-1}$ | 91.1% retention after 4000 cycles 5.0 $Ag^{-1}$ | 0.2 to 1.6 V |
| 12 | $VO_2$ | 3M $Zn(CF_3SO_3)_2$ | Glass fibre membrane | 274 mAh $g^{-1}$ @0.1 133@10 A $g^{-1}$ | 79% retention after 10000 cycles @ 10.0 $Ag^{-1}$ | 0.7 to 1.7 V |
| 13 | $V_3O_7 \cdot H_2O$/rGO | 1M $ZnSO_4$ | — | 271 mAh $g^{-1}$ @0.3 A $g^{-1}$ | 79% retention after 1000 cycles @1.5 $Ag^{-1}$ | 0.3 to 1.5 V |
| 14 | $Na_2V_6O_{16} \cdot 3H_2O$ | 1M $ZnSO_4$ | Glass fibre membrane | 361 mAh $g^{-1}$ @0.1 A $g^{-1}$ | 84.5% retention after 1000 cycles @ 14.4 $Ag^{-1}$ | 0.4 to 1.4 V |
| 15 | $Zn_3V_2O_7(OH)_2 \cdot 2H_2O$ | 1m $ZnSO_4$ | Polypropylene | 213 mAh $g^{-1}$ @0.05 A $g^{-1}$ | 68% retention after 300 cycles @ 0.2 $Ag^{-1}$ | 0.2 to 1.8 V |
| 16 | calix[4]quinone | 3M $Zn(CF_3SO_3)_2$ | STC | 335 mAh $g^{-1}$ @0.05 A $g^{-1}$ | 87% retention after 1000 cycles @0.5 $Ag^{-1}$ | 0.2 to 1.8 V |
| 17 | $NaV_3O_8 \cdot 1.5H_2O$ | 1M $ZnSO_4$/1M $Na_2SO_4$ | Filter paper | 380 mAh $g^{-1}$ @0.05 A $g^{-1}$ | 82% retention after 1000 cycles @4 $Ag^{-1}$ | 0.3 to 1.25 V |
| 18 | $Ca_{0.24}V_2O_5 \cdot 0.83H_2O$ | 1M $ZnSO_4$ | Glass fibre membrane | 72 mAh $g^{-1}$ @80 C. | 96% retention after 3000 cycles @ 80 C. | 0.6 to 1.6 V |
| 19 | $Na_3V_2(PO_4)_2F_3$ | 2M $Zn(CF_3SO_3)_2$ | Glass fibre membrane | 47 mAh $g^{-1}$ @1.0 A $g^{-1}$ | 95% retention after 4000 cycles @ 1.0 $Ag^{-1}$ | 0.8 to 1.9 V |

-continued

| No | Cathode electrode material | Electrolyte | Separator | Discharge capacity | Cycling stability | Voltage |
|---|---|---|---|---|---|---|
| 20 | β-MnO$_2$ | 1M ZnSO$_4$ | — | 270 mAh g$^{-1}$ @0.1 A g$^{-1}$ | 75% retention after 200 cycles @ 0.2 A g$^{-1}$ | 1.0 to 1.8 V |
| 21 | CNF paper | 1.0M LiCF3SO3 and 0.1M LiNO3 in DOL/DME (non-aqueous electrolyte) | STC | 950 mAh g − 1 @ C/2 | 47% retention after 500 cycles @ C/2 rate | 1.6-2.8 V |
| 22 | CNT-S (50%) | 1.0M LiTFSI in DOL/DME (non-aqueous electrolyte) | Polypropylene 2400 coated with STC solution | 781 mAh g$^{-1}$ @ 1.7 A g$^{-1}$ | 60% retention after 500 cycles @ 1.7 A g$^{-1}$ | 1.7-2.8 V |
| 23 | V$_2$O$_5$ | 3M ZnSO$_4$ | STC | 510 mAh g$^{-1}$ @ 0.25 A g$^{-1}$ | 85% retention after 1300 cycles @ 5 A g$^{-1}$ 88% retention after 1800 cycles @ 10 A g$^{-1}$. | 0.2 to 1.6 V |

EXAMPLES

Following examples are given by way of illustration therefore should not be construed to limit the scope of the invention.

Example 1: Fabrication of Electrode

Prior to the electrodeposition, a piece of pristine carbon paper (pCP) was subjected to anodization by applying a bias potential of 10 V for 5 min in a two-electrode cell assembly in 0.1 M Na$_2$SO$_4$ electrolyte solution. During anodization, pCP and platinum wire were used as the positive and negative electrode, respectively. The precursor solution for the electrodeposition contains 0.2 M VOSO$_4$.xH$_2$O and 0.25 M LiClO$_4$ in 1:1 water and ethanol mixture. Electrochemical deposition was carried out by the chronopotentiometric method in a BioLogic SP-300 Potentio-Galvanostat in a three-electrode cell assembly. The functionalised carbon paper, Pt wire, and a piece of flexible graphite were employed as the working, quasi-reference and counter electrodes, respectively. A constant current of 3 mA was applied for 177 seconds to obtain 1 mg loading of V$_2$O$_5$ in 1 cm$^2$ area of the carbon paper. The obtained electrode is subjected to annealing at 250° C. for 2 hr and marked as V-CP.

Example 2: Pre-Treatment of the STC Ionomer Membrane

Prior to the use, all the STC ionomer membranes were separately treated at 80° C. for 30 min. in 1) 4 wt % H$_2$O2,2) DI water, 3) 0.8M H$_2$SO$_4$ and 4) DI water, respectively (numbers represent the order of treatment). The as obtained activated STC ionomer membranes were dipped in desired electrolyte (aqueous solution of ZnSO$_4$. 7H$_2$O) with salt concentration of 0, 1, 2 and 3M, respectively, for 3 days. The respective membranes are marked as XM-STC, where 'X' stands for the concentration of the electrolyte solution used.

Example 3: Modification of the Conventional Porous Membrane

To study the effect of conventional porous separator on the performance of the ZAIB, three different porous membranes (Polypropylene, whatman filter paper, glass fibre paper) were used. All the porous membranes were also soaked in 3M ZnSO$_4$ prior to the use and the corresponding membranes are termed as 3M-Y, where, 'Y' represents the type of the membrane used.

Example 4: Assembly of Zn/V$_2$O$_5$ Batteries

All the Zn/V$_2$O$_5$ cells were fabricated in CR2032 coin cell assembly. A Zn metal (area 1 cm$^2$), V-CP electrode (area 1 cm$^2$) and desired STC membrane (XM-STC) were used as anode, cathode and separator, respectively. Here, the terms anode and cathode are used for negative and positive electrode, respectively, considering the discharge state of battery. For comparison purpose, several other Zn/V$_2$O$_5$ batteries were also assembled using conventional porous membrane separators. In accordance with the various separators used, the respective cells are designated as V-XM-Y, where 'X' and 'Y' stand for the concentration of ZnSO$_4$ electrolyte and type of the membrane used, respectively.

Example 5: Material Characterization

Morphology investigations were performed with a field emission scanning electron microscope (FESEM) Nova Nano SEM 450. A Tecnai T-20 instrument was used for the transmission electron microscopy (TEM) imaging at an accelerating voltage of 200 kV. XPS analysis was carried out through Thermo K-alpha+X-ray spectrometer.

Example 6: Electrochemical Characterization

The electrochemical analyses were carried out in Bio-Logic VMP3 Potentio-Galvanostat instrument. Electrochemical Impedance spectroscopy (EIS) analysis was used to determine the ionic conductivity of the membrane. The frequency for EIS analysis was varied from 1 MHz to 1 Hz against an open circuit potential with a sinus amplitude of 10 mV (Vrms=7.07 mV). The conductivity cells were fabricated in CR2032 coin cell assembly by keeping the desired membranes in between two stainless steel plates with 1 mm thickness. The conductivity measurement was carried out between 20° C. to 60° C. at every 10° C. interval. The temperature was controlled by using Espec environmental test chamber.

In order to study the effect of STC ionomer based membrane in the plating/stripping behaviour of Zn, electrochemical cells were fabricated by using a piece of Zn metal foil (1 cm$^2$ area), pCP (1 cm$^2$ area) and the desired STC membrane as anode, cathode and separator, respectively. For comparison purpose same kind of cells were prepared with other porous membranes. The cells are designated as CP-XM-Y, where 'X' and 'Y' carry the same information as mentioned in the previous section. These cells were characterized by cyclic voltammetry (CV) analysis. The reversibility of Zn plating/stripping in presence of various separator membranes were also studied in Zn/Zn symmetric cell configuration with two Zn foils separated by desired STC ionomer membranes and other porous separator membranes. These cells were characterized by galvanostatic charge/discharge (CD) analysis at current density of 0.1 mA cm$^{-2}$ for 80 h.

To check the performance of the Zn/V$_2$O$_5$ battery CV (1.0, 0.5, 0.3, and 0.1 mV s$^{-1}$) and CD (0.25, 0.5, 1, 3, 5, 7, 10 A g$^{-1}$ analysis were carried out in the voltage window of 1.6 V-0.2 V. The cycling stability tests were performed at current densities of 5 A g$^{-1}$ and 10 A g$^{-1}$.

Advantages of the Invention

It is the first time a cation selective membrane separator is used in aqueous Zn/TMO battery.

It is the first time the strategy of using free-standing electrode is adopted in aqueous Zn ion battery.

The highest discharge capacity among all other Zn based battery is obtained.

Unlike porous conventional separator the ionomer membrane separator offers an ultrahigh life span of the Zn/TMO battery.

The high discharge capacity and large potential window of the battery provides high energy density of 250-400 W h kg$^{-1}$ which is superior to the previously reported ZAIBs and significantly higher than commercial Li-ion battery.

The surface controlled insertion/de-insertion (capacitive in nature) of electrolyte ions offer a high power output which is a highly desirable criterion for any efficient energy storage device. Ionomer based Zn/V$_2$O$_5$ battery offers an ultrahigh power density ranging from 195 W kg$^{-1}$ to 7800 W kg$^{-1}$.

Moreover this strategy can be adopted for the fabrication of flexible battery as well.

We claim:

1. An energy storage device comprising Zn as an anode, electrodeposited V$_2$O$_5$ on functionalized carbon as a cathode, sulfonated tetrafluoroethylene copolymer (STC) as a cation selective ionomer membrane separator and ZnSO$_4$ as an electrolyte.

2. The energy storage device as claimed in claim 1, wherein the device further comprises of a free-standing electrode.

3. The energy storage device as claimed in claim 1, wherein the device is a battery.

4. The energy storage device as claimed in claim 3, wherein said battery exhibits outstanding cycling stability with a retention of 85% after 1300 cycles at 5 A g$^{-1}$ current density and with a retention of 88% after 1800 cycles at 10 A g$^{-1}$ current density.

5. The energy storage device as claimed in claim 3, wherein said battery provides an energy density of 250-400 W h kg$^{-1}$.

6. A process for fabrication of the energy storage device as claimed in claim 1, wherein said process comprises:
   a. subjecting a piece of a pristine carbon paper (pCP) to anodization or electrochemical functionalization by applying a bias potential of 10 V to 20 V for 5 to 10 mins in a two-electrode cell assembly in an electrolyte solution to obtain a functionalized carbon paper;
   b. carrying electrochemical deposition on the functionalized carbon paper with a cathode active material to obtain a cathode active material deposited carbon paper; and
   c. assembling the device, a piece of metal foil as an anode and an electrolyte impregnated ionomer membrane as a separator cum electrolyte.

7. The process as claimed in claim 6, wherein the active material is V$_2$O$_5$, the metal is Zn and the ionomer membrane is STC.

8. The process as claimed in claim 6, wherein in step (a) the electrolyte is Na$_2$SO$_4$ and in step (c) the electrolyte is ZnSO$_4$.

* * * * *